Patented Nov. 2, 1943

2,333,124

UNITED STATES PATENT OFFICE 2,333,124

METHOD OF STERILIZING AIR

Oswald H. Robertson, Benjamin F. Miller, and Edward Bigg, Chicago, Ill.

No Drawing. Application July 23, 1941, Serial No. 403,668

19 Claims. (Cl. 21—53)

This invention relates to methods of sterilizing air by means of vapors.

Attempts have been made to sterilize air by means of liquid aerosols, but these have not proved to be completely satisfactory. In so far as we are aware, complete and instantaneous sterilization of air by means of vapors derived from generally non-germicidal materials has not heretofore been accomplished.

The liquid aerosols of the prior art consist of solutions of germicidal agents dispersed in minute droplet form. The most effective of these are resorcinol and hexyl resorcinol. In preparing these prior art aerosols, the germicidal agents were preliminarily dissolved in a suitable solvent and the solutions then atomized to form droplets of the desired size. The solvents used were water, benzyl alcohol, benzyl benzoate, cyclohexanol, methylated spirits, alcohol, glycols, glycerine and like suitable vehicles or carriers for the desired germicidal agents.

The air sterilization effectiveness of these prior art aerosols, when disseminated throughout an enclosed space, was considered to be entirely dependent upon the germicidal agent used. Most of these germicidal agents are objectionably toxic and hence their use is extremely limited. The most effective ones, resorcinol and hexyl resorcinol, also possess a certain degree of toxicity and may produce objectionable local and systemic effects when inhaled over long periods of time.

Incidental attempts to sterilize air by means of liquid aerosols formed from alcoholic solutions of propylene glycol have been made. We have found that propylene glycol, in the concentrations named, is incapable of effecting any substantial or instantaneous sterilization of air. The results obtained by these prior art workers appear to be due to the presence of the alcohol in vapor form. These prior art workers (Twort et al., Jour. Hygiene, 40:253, 1940) did not recognize the need for a lethal dose of the glycol in vapor form in the air. In fact, they labored under the misapprehension that "a molecular dispersion, i. e. a vapour, is ineffective" to sterilize air.

In accordance with our invention, we have found that the glycols themselves, in vapor form, are capable of effecting complete and instantaneous sterilization of a bacteria-laden atmosphere, including an atmosphere laden with pathogenic invaders of the respiratory tract. We have found that small amounts of a glycol in vapor form in an atmosphere containing as many as 150,000 to 250,000 bacteria per liter of air, and even more, has a 100% lethal action on the bacteria. In addition, this lethal action takes place with surprising rapidity, in most cases substantially instantaneously and in others in a period in the order of only a few seconds.

Any of the glycols such as diethylene glycol, 1,3, butylene glycol and trimethylene glycol may be used in accordance with our invention, but we prefer ethylene glycol, propylene glycol and 2,3, butylene glycol. Propylene glycol is particularly preferred because of its superior sterilizing activity and apparent low toxicity and because it can be inhaled for some time without producing any undesired local or systemic effects. The sterilizing glycol vapors have a prolonged sterilizing action, in fact of indefinite duration where the concentrations of vapors in the air are maintained as hereinafter described.

In the sterilization of air in a chamber, room, or other enclosed space with glycol vapors in accordance with our invention, the liquid glycol, for example propylene glycol, is vaporized in any desirable manner as by heat or by bubbling air through a body of the glycol, and the glycol vapors are then introduced into the enclosed space and permitted to intermingle with the air therein. The vapors may be introduced into the enclosed space in any desirable manner as through a conduit. Thus, they may be sprayed, pumped or blown into the enclosed space. If desired, the vapors may be generated within the space. The quantity of glycol vapors introduced into the space may vary as hereinafter described, and their sterilizing effectiveness is independent, within wide limits, of the number of bacteria in the air.

A minimum quantity of the glycol vapors should be introduced into the chamber, sufficient to instantaneously kill the bacteria in the air. As a matter of ordinary precaution, particularly where complete sterilization is desired, a slight excess should be introduced.

In some instances we have found that complete and substantially instantaneous air sterilization may be effected by the introduction of as little as about 1 gram of propylene glycol, for example, in vapor form, in about 10 to about 15 million cubic centimeters of air under normal conditions of temperature and pressure, dependent to some extent on the resistance of the bacteria. This same amount of glycol vapor is capable of sterilizing even larger volumes of air, say about 20 to about 30 million cubic centimeters; however, in such dilutions the lethal action of the vapors on the bacteria is not always substantially instantaneous. Even in more extreme dilutions this same amount of vapor is capable of imparting a delayed lethal action on many bacteria, particularly those of low resistance, such as the pathogenic invaders of the respiratory tract, for example, pneumococci Type I.

Ethylene glycol vapors and 2,3 butylene glycol vapors are about as effective as the propylene glycol vapors. Some of the other glycol vapors are not as effective and hence larger quantities of these vapors are necessary to effect instantaneous air sterilization.

The quantity of moisture in the air, within wide limits, but not including conditions which prevent the glycol from adequately contacting the bacteria, does not appear to affect the sterilizing activity of the vapors. It is preferred that some atmospheric moisture be present, as it normally is and as encountered in living spaces. Likewise, fluctuations in temperature and pressure do not appear to affect this activity.

While the precise minimum amount of glycol vapors to be introduced into a particular chamber to effect sterilization may be determined experimentally for any given microorganism with scientific exactness, it is manifest that such exactness is not an ordinary requisite. In general, sufficient of the vapors should be introduced to at least effect instantaneous sterilization while avoiding such an undue excess as may be wasteful of the material. For most purposes, complete and substantially instantaneous air sterilization may be effected by intermingling as little as about 1 gram of the glycol in vapor form in about 1 to about 7 million cubic centimeters of air. In the case of the pathogenic invaders of the respiratory tract, about 1 gram of the glycol in vapor form in about 5 to 7 million cubic centimeters is substantially instantaneously effective. We have found that this quantity of vapors is sufficient to kill bacteria in the air, whether the number be low, or high, say 300,000 or more per liter of air.

When a theatre, auditorium, factory, house, air-raid shelter, submarine, or like chamber which is intermittently opened is to be air-sterilized in accordance with our invention, the glycol vapors are introduced in amounts as described; howver, to compensate for the diluting effect of air introduced into the chamber from time to time, sufficient glycol vapors should be supplied to the chamber either intermittently or continuously, as desired, to maintain the concentration of vapors necessary for killing purposes. The bacteria air-borne into the chamber from time to time are immediately killed upon contact with the vapors. In cases in which there is a continuous introduction of fresh air or recirculation of filtered air, as in the operation of some air-conditioning systems, appropriate amounts of the glycol vapors may be introduced in the entering air either continuously or intermittently.

Since it is manifestly impractical to determine the exact amount of diluting air introduced into the chamber from time to time, practical considerations require that an approximation be made and that sufficient vapors, with a safe excess amount to allow for error, be introduced to compensate for the dilutions and thereby maintain the air of the chamber continuously sterile. The approximation can be arrived at experimentally. From our experiments, we have found that approximations may be made which, from practical considerations, in most instances equal the exact amount of diluting air, plus or minus 5%.

The manner of introducing the glycol vapors into the chamber is, obviously, a matter of choice and convenience and may be varied widely. One desirable and practical way is to carry the vapors into the chamber along with cooled air and thereby simultaneously condition and sterilize the air within the chamber. Since to carry out this method it is possible to utilize existing air-conditioning systems, it is manifest that where such systems are in use, the methods of our invention may be readily incorporated therein at a minimum of expense.

One convenient and effective manner of vaporizing the glycols within the chamber is to spray or otherwise introduce therein glycol aerosols wherein the glycol droplets have a diameter less than about 5 microns, preferably of approximately 1 to 3 microns. These droplets vaporize rapidly and, usually, vaporization is complete in about 5 to 10 minutes. If desired, larger glycol droplets may be introduced into the chamber, but we do not regard these as particularly desirable since they tend to vaporize too slowly and condense and settle to the floor, or collect on the surrounding walls. The glycol aerosols as above referred to, on the other hand, vaporize completely before any condensation or settling takes place.

If, for some reason, it is desired to maintain the glycols in aerosol form for longer periods of time, say about 1 to 2 hours, this can be done by adding about 5% of glycerine to the glycol before forming the aerosol. Smaller amounts of glycerine are not particularly effective for this purpose and larger amounts do not appear to improve the relative permanency of the aerosol. Other compounds may be used in lieu of glycerine to increase the relative permanency of the aerosol. Thus, polyhydroxy alcohols such as sorbitol may be used.

The aerosol may be formed and introduced into the chamber by means of a suitable atomizer capable of forming a mist sufficiently fine to act as an effective aerosol. One such atomizer is the Graeser atomizer capable of producing liquid aerosols containing droplets of approximately 1 to 3 microns. This atomizer is described by J. B. Graeser and A. H. Rowe in Jour. Allergy, 6:415, 1935. Obviously, other suitable atomizers or spray devices may be used which are capable of forming droplets of about the same size, or of smaller or larger size, as desired.

The glycols, whether in liquid aerosol or large droplet form, should be supplied to the chamber in amounts to provide sufficient vapors to effect sterilization as described above.

In carrying out certain small scale tests of our invention, the following technique was employed: Known quantities of a bacterial suspension were sprayed from a Graeser atomizer into two identical rectangular, glass-walled chambers, each having a capacity of 60 liters. One of these chambers was used for the test and the other for the control. The chamber air was gently agitated by means of a slowly rotating rubber-bladed fan. The number of viable bacteria recoverable from the air in the chambers was determined by withdrawing from each chamber a measured volume of air at a constant rate through a glass funnel suspended directly above the surface of an agar plate within a sealed glass jar. (This air sampling technique is a modification of that described by Hollaender and Dallavalle in Public Health Service, 54:574, 1939.) In this manner, a relatively uniform number of colonies of bacteria on the agar plates was obtained from each chamber following the introduction into the chambers of the same amounts of standardized bacterial suspension. Propylene glycol vapor or other glycol vapors were then, or preliminary to the introduction of the bacteria, introduced into the test chamber, the quantity being sufficient to supply in the chamber about 30 milligrams of the glycol in vapor form. A like amount of water vapor was introduced into the control chamber.

The following table shows the germicidal effectiveness of propylene glycol in vapor form on the test organism *Staphylococcus albus*:

Table I

Vapor=Propylene glycol (vapor in test chamber before bacteria introduced).
Organism=*Staphylococcus albus*.
Concentration=1 part by weight of vapor in 3,000,000 volumes of air.

| | Time intervals of samples | Number of colonies on plate from— | |
|---|---|---|---|
| | | Control chamber | Test chamber |
| 1 | Immediately after bacterial spray | 552 | 1 |
| 2 | 5 minutes after bacterial spray | 400 | 0 |
| 3 | 20 minutes after bacterial spray | 272 | 0 |

The falling off of the number of colonies in the control chamber, as shown in the table, is a natural phenomenon, probably due to settling of bacterial droplets, their agglomeration, or possibly death of some of the organisms, or a combination of these factors. The exact explanation of this phenomenon is not known.

Other microorganisms have been found to be similarly susceptible to the action of propylene glycol vapors and to the action of the vapors of other glycols. Thus, pathogenic invaders of the respiratory tract, e. g., pneumococci Type I and Type III, hemolytic streptococci and hemolytic staphylococci, as well as organisms of lesser or no pathogenicity, such as *Streptococcus viridans*, *Bacillus coli*, *Micrococcus catarrhalis* and *Bacillus subtilis*, were killed immediately after contact with propylene glycol, ethylene glycol, and 2,3, butylene glycol, and very quickly in the case of glycols such as trimethylene glycol.

We have found that the sterilizing activity of the vapors is effective regardless of whether the bacteria are introduced into a chamber already containing the vapors or vice versa. Tests carried out with glycerine show that the vapors of this compound have only a slight, inconsequential capacity to destroy bacteria in air.

The sterilizing effectiveness of the vapors in accordance with our invention is further demonstrated by the results shown in the following Tables II to IX:

Table II

Vapor=Propylene glycol (vapor in test chamber before bacteria introduced).
Organism=Pneumococcus Type I.
Concentration=1 part by weight of vapor in 3,000,000 volumes of air.

| | Time intervals of samples | Number of colonies on plate from— | |
|---|---|---|---|
| | | Control chamber | Test chamber |
| 1 | Immediately after bacterial spray | 1,952 | 3 |
| 2 | 5 minutes after bacterial spray | 1,264 | 0 |
| 4 | 20 minutes after bacterial spray | 484 | 0 |

Table III

Vapor=Propylene glycol (vapor in test chamber before bacteria introduced).
Organism=Hemolytic streptococci.
Concentration=1 part by weight of vapor in 7,000,000 volumes of air.

| | Time intervals of samples | Number of colonies on plate from— | |
|---|---|---|---|
| | | Control chamber | Test chamber |
| 1 | Immediately after bacterial spray | 1,760 | 0 |
| 2 | 5 minutes after bacterial spray | 1,064 | 0 |
| 3 | 20 minutes after bacterial spray | 436 | 0 |

Table IV

Vapor=Ethylene glycol (vapor in test chamber before bacteria introduced).
Organism=Hemolytic streptococci.
Concentration=1 part by weight of vapor in 2,500,000 volumes of air.

| | Time intervals of samples | Number of colonies on plate from— | |
|---|---|---|---|
| | | Control chamber | Test chamber |
| 1 | Immediately after bacterial spray | 1,344 | 0 |
| 2 | 5 minutes after bacterial spray | 928 | 0 |
| 3 | 20 minutes after bacterial spray | 320 | 0 |

Table V

Vapor=2,3, butylene glycol (vapor in test chamber before bacteria introduced).
Organism=*Staphylococcus albus*.
Concentration=1 part by weight of vapor in 1,000,000 volumes of air.

| | Time intervals of samples | Number of colonies on plate from— | |
|---|---|---|---|
| | | Control chamber | Test chamber |
| 1 | Immediately after bacterial spray | 752 | 1 |
| 2 | 5 minutes after bacterial spray | 392 | 0 |
| 3 | 20 minutes after bacterial spray | 216 | 0 |

Table VI

Aerosol=Proylene glycol.
Organism=*Staphylococcus albus*.
Concentration=1 part by weight of Aerosol in 1,750,000 volumes of air.

| | Time intervals of samples | Number of colonies on plate from— | |
|---|---|---|---|
| | | Control chamber | Test chamber |
| 1 | Immediately after bacterial spray | 2,204 | 1,860 |
| 2 | Immediately after H₂O in control and Aerosol in test | | |
| 3 | 15 minutes later | 764 | 1 |
| 4 | 30 minutes later | 532 | 0 |
| | | 336 | |

Table VII

Aerosol=Propylene glycol.
Organism=Pneumococcus Type I.
Concentration=1 part by weight of Aerosol in 3,000,000 volumes of air.

| | Time intervals of samples | Number of colonies on plate from— | |
|---|---|---|---|
| | | Control chamber | Test chamber |
| 1 | Immediately after bacterial spray | 832 | 880 |
| 2 | Immediately after H₂O in control and Aerosol in test | | |
| 3 | 15 minutes later | 632 | 0 |
| 4 | 30 minutes later | 364 | 0 |
| | | 304 | 0 |

Table VIII

Aerosol = Propylene glycol.
Organism = Hemolytic streptococci.
Concentration = 1 part by weight of Aerosol in 3,000,000 volumes of air.

| | Time intervals of samples | Number of colonies on plate from— | |
|---|---|---|---|
| | | Control chamber | Test chamber |
| 1 | Immediately after bacterial spray | 2,720 | 2,288 |
| 2 | Immediately after H₂O in control and Aerosol in test | 1,904 | 0 |
| 3 | 15 minutes later | 992 | 0 |
| 4 | 30 minutes later | 832 | 0 |

Table IX

Aerosol = Ethylene glycol.
Organism = *Staphylococcus albus*.
Concentration = 1 part by weight of Aerosol in 1,750,000 volumes of air.

| | Time intervals of samples | Number of colonies on plate from— | |
|---|---|---|---|
| | | Control chamber | Test chamber |
| 1 | Immediately after bacterial spray | 1,488 | 1,568 |
| 2 | 15 minutes after H₂O in control and Aerosol in test | 492 | 0 |
| 3 | 30 minutes later | 160 | 0 |

The 100% lethal action of the glycol vapors was demonstrated in each case. In one test, air from the control chamber was drawn or bubbled slowly through 25–50 cc. of diluted nutrient broth in a glass cylinder containing many small beads. Plated samples of this fluid yielded large numbers of colonies, whereas similar samples of fluid, obtained from the glycol vapor-treated air, were sterile.

Experiments were performed to prove that glycol treated bacteria could not infect susceptible animals. In these tests, air laden with virulent pneumococci Type I was treated with propylene glycol vapors as described above. The treated air was then drawn through sterile broth in a bead tower, and 1 cc. quantities of this broth were then injected into mice. These animals survived. However, when the same experiments were performed with air drawn from the control chamber, all the mice died of pneumococcic infection.

In order to demonstrate the presence of killed bacteria in glycol vapor-treated air, the moisture of the air drawn from the chamber was condensed on a chilled microscope slide. The microorganisms were stained and identified. Samples of the condensed fluid showed absolutely no growth.

In general, the propylene glycol vapors, in the amounts in air stated, exhibit 100% lethal action on the bacteria in the air, the time being dependent to some extent on the resistance of the bacteria. This lethal action is substantially instantaneous with contact as in certain instances as pointed out above. Such rapidity of killing is of paramount importance in preventing infections caused by bacteria expelled during sneezing or coughing, especially where persons are in close proximity.

Ethylene glycol and 2,3 butylene glycol exhibited a similar lethal action and the other glycols a substantially similar lethal action.

The propylene glycol vapors in the amounts hereinabove set forth and even in considerably larger amounts are substantially non-toxic and produce no objectionable local or systemic effects even when inhaled continuously for prolonged periods of time. Hence, the use of these vapors for sterilizing air in submarines, tanks, air-raid shelters, operating rooms, factories, stores, trains, theatres and the like is indicated. Some of the other glycol vapors appear to have a slight toxic effect, but this does not preclude their use for sterilizing air in certain industrial establishments and other places where the entry of persons is only occasional and for short periods of time as in a refrigerated meat storage room.

The vapors of a mixture of glycols, for example, a mixture of ethylene and propylene glycol are also capable of sterilizing air substantially instantaneously.

Although we have described our invention in connection with the sterilization of air containing bacteria, our invention is also effective to sterilize air containing viruses, spores, yeasts and molds.

While the tests described herein were carried out experimentally as above described, we have duplicated our results in tests wherein we employed the same technique, but used room-sized chambers for the control and test chamber.

We claim:

1. The method of effecting substantially instantaneous sterilization of air laden with bacteria or other pathogenic organisms comprising contacting the air with a glycol in vapor form in proportions to provide about 1 gram of said glycol in vapor form to not more than about 5 to about 7 million cubic centimeters of air.

2. The method of effecting substantially instantaneous sterilization of air laden with bacteria or other pathogenic organisms comprising contacting the air with a mixture of glycols in vapor form in proportions to provide about 1 gram of said glycols in vapor form to not more than about 5 to 7 million cubic centimeters of air.

3. The method of effecting substantially instantaneous sterilization of bacteria-laden air comprising contacting the air with propylene glycol in vapor form in proportions to provide about 1 gram of said glycol in vapor form to not more than about 5 to about 7 million cubic centimeters of air.

4. The method of effecting substantially instantaneous sterilization of bacteria-laden air comprising contacting the air with 2,3 butylene glycol in vapor form in proportions to provide about 1 gram of said glycol in vapor form to not more than 5 to about 7 million cubic centimeters of air.

5. The method of effecting substantially instantaneous sterilization of bacteria-laden air comprising contacting the air with ethylene glycol in vapor form in proportions to provide about 1 gram of said glycol in vapor form to not more than about 5 to about 7 million cubic centimeters of air.

6. The method of effecting substantially instantaneous sterilization of bacteria-laden air comprising introducing a glycol in aerosol form into the air for effective vaporization therein in quantities to provide about 1 gram of said glycol to not more than about 5 to 7 million cubic centimeters of air.

7. The method of effecting substantially instantaneous sterilization of bacteria-laden air comprising introducing propylene glycol in aerosol form into the air for effective vaporization therein in quantities to provide about 1 gram of said glycol to not more than about 5 to 7 million cubic centimeters of air.

8. The method of effecting substantially instantaneous sterilization of bacteria-laden air comprising introducing 2,3 butylene glycol in aerosol form into the air for effective vaporization therein in quantities to provide about 1 gram of said glycol to not more than about 5 to 7 million cubic centimeters of air.

9. The method of effecting substantially instantaneous sterilization of bacteria-laden air comprising introducing ethylene glycol in aerosol form into the air for effective vaporization therein in quantities to provide about 1 gram of said glycol to not more than about 5 to 7 million cubic centimeters of air.

10. The method of effecting substantially instantaneous sterilization of bacteria-laden air comprising contacting air with a glycol in vapor form in proportions to provide about 1 gram of said glycol in vapor form to not more than about 10 to 15 million cubic centimeters of air.

11. The method of effecting substantially instantaneous sterilization of bacteria-laden air comprising contacting air with propylene glycol in vapor form in proportions to provide about 1 gram of said glycol in vapor form to not more than about 10 to 15 million cubic centimeters of air.

12. The method of effecting substantially instantaneous sterilization of bacteria-laden air comprising contacting air with 2,3 butylene glycol in vapor form in proportions to provide about 1 gram of said glycol in vapor form to not more than about 10 to 15 million cubic centimeters of air.

13. The method of effecting substantially instantaneous sterilization of bacteria-laden air comprising contacting air with ethylene glycol in vapor form in proportions to provide about 1 gram of said glycol in vapor form to not more than about 10 to 15 million cubic centimeters of air.

14. The method of effecting sterilization of bacteria-laden air comprising contacting air with a glycol in vapor form in proportions to provide not more than about 1 gram of said glycol in vapor form to about 15 to 30 million cubic centimeters of air.

15. The method of effecting sterilization of bacteria-laden air comprising contacting air with propylene glycol in vapor form in proportions to provide not more than about 1 gram of said glycol in vapor form to about 15 to 30 million cubic centimeters of air.

16. The method of effecting sterilization of bacteria-laden air comprising contacting air with 2,3 butylene glycol in vapor form in proportions to provide not more than about 1 gram of said glycol in vapor form to about 15 to 30 million cubic centimeters of air.

17. The method of effecting sterilization of bacteria-laden air comprising contacting air with ethylene glycol in vapor form in proportions to provide not more than about 1 gram of said glycol in vapor form to about 15 to 30 million cubic centimeters of air.

18. The method of effecting substantially instantaneous sterilization of air laden with bacteria or other pathogenic organisms comprising contacting the air with propylene glycol in vapor form in proportions to provide about 1 gram of said glycol in vapor form to not more than about 5 to 7 million cubic centimeters of air.

19. The method of effecting sterilization of air laden with bacteria or other pathogenic invaders of the respiratory tract comprising contacting the air with a glycol in vapor form in proportions to provide at least sufficient of the vapors with respect to the air to effect a substantially instantaneous lethal action on the bacteria in the air, such proportions being less than about 1 gram of the glycol in vapor form to about 5 to 7 million cubic centimeters of air.

OSWALD H. ROBERTSON.
BENJAMIN F. MILLER.
EDWARD BIGG.